(12) United States Patent
Sharma et al.

(10) Patent No.: US 8,677,313 B2
(45) Date of Patent: Mar. 18, 2014

(54) FUNCTIONAL DESIGN CREATION TOOL

(75) Inventors: Vibhu S. Sharma, Aligarh UP (IN); Santonu Sakar, Bangalore (IN); Kunal Verma, Sunnyvale, CA (US); Arun Panayappan, Bangalore (IN); Alex Kass, Palo Alto, CA (US)

(73) Assignee: Accenture Global Services Limited, Dublin (IE)

( * ) Notice: Subject to any disclaimer, the term of this patent is extended or adjusted under 35 U.S.C. 154(b) by 589 days.

(21) Appl. No.: 12/954,116

(22) Filed: Nov. 24, 2010

(65) Prior Publication Data
US 2011/0214104 A1    Sep. 1, 2011

(30) Foreign Application Priority Data
Nov. 30, 2009   (IN) .......................... 2768/MUM/2009

(51) Int. Cl.
*G06F 9/44*    (2006.01)
*G06F 9/45*    (2006.01)
*G06F 17/00*   (2006.01)

(52) U.S. Cl.
USPC ............................. 717/109; 717/113; 715/234

(58) Field of Classification Search
None
See application file for complete search history.

(56) References Cited

U.S. PATENT DOCUMENTS

| 6,782,403 | B1* | 8/2004 | Kino et al. ..................... 715/234 |
| 6,931,591 | B1* | 8/2005 | Brown et al. .................. 715/234 |
| 7,065,742 | B1* | 6/2006 | Bogdan ......................... 715/234 |
| 7,200,448 | B2* | 4/2007 | Cachat et al. ................. 717/109 |
| 7,761,848 | B1* | 7/2010 | Chaffin ......................... 717/116 |
| 7,941,438 | B2* | 5/2011 | Molina-Moreno et al. ... 717/109 |
| 8,015,541 | B1* | 9/2011 | Srinivasan et al. ............ 717/109 |
| 8,365,138 | B2* | 1/2013 | Iborra et al. ................... 717/113 |
| 2002/0184610 | A1* | 12/2002 | Chong et al. .................. 717/109 |
| 2004/0024630 | A1* | 2/2004 | Ganesan et al. ................... 705/8 |
| 2004/0044990 | A1* | 3/2004 | Schloegel et al. ............. 717/109 |
| 2006/0064674 | A1* | 3/2006 | Olson et al. ................... 717/113 |
| 2006/0075382 | A1* | 4/2006 | Shaburov ...................... 717/106 |
| 2009/0138793 | A1* | 5/2009 | Verma et al. .................. 715/234 |
| 2010/0125828 | A1* | 5/2010 | Vasista .......................... 717/109 |
| 2011/0029951 | A1* | 2/2011 | Jansen et al. .................. 717/113 |
| 2013/0174119 | A1* | 7/2013 | Chang et al. .................. 717/109 |

OTHER PUBLICATIONS

David M. Gann et al.; Design Quality Indicator as a tool for thinking; 2003; retrieved online on Oct. 21, 2013; pp. 318-333; Retrieved from the Internet: <URL: http://dqionline.com/downloads/DQI__As__a__Tool__for__Thinking.pdf>.*

Jan Lodewijk Bonebakker; Finding Representative Workloads for Computer System Design; 2007; retrieved online on Oct. 21, 2013; pp. 1-250; Retrieved from the Internet: <URL: http://delivery.acm.org/10.1145/1700000/1698205/smli__tr-2007-174.pdf?>.*

(Continued)

*Primary Examiner* — Thuy Dao
*Assistant Examiner* — Hanh T Bui
(74) *Attorney, Agent, or Firm* — Brinks Gilson & Lione

(57) ABSTRACT

A functional design creation tool generates a functional design diagram for visual presentation on a display. The functional design creation tool extracts content from a processed requirements specification including one or more processed requirement statements. The functional design creation tool applies one or more glossaries and a set of heuristic rules to the extracted content. Functional design diagram components may be generated by the functional design creation tool based on the application of the glossaries and set of heuristic rules. The functional design tool may generate a functional design diagram based on the functional design diagram components. The functional design diagram may be transmitted to a display.

19 Claims, 9 Drawing Sheets

(56) References Cited

OTHER PUBLICATIONS

Kevin L. Mills and Hassan Gomaa; Knowledge-Based Automation of a Design Method for Concurrent Systems; Mar. 2002; IEEE; retrieved online on Oct. 21, 2013; pp. 228-255; Retrieved from the Internet: <URL: http://ieeexplore.ieee.org/stamp/stamp.jsp?tp=&arnumber=991319>.*

J.G. Hall, M. Jackson, R.C. Laney, B.Nuseibeh, and L. Rapanotti, "Relating software requirements and architectures using problem frames," in *Proc. of the IEEE Joint International Conference on Requirements Engineering*, 2002m pp. 137-144.

P. Grnbacher, A. Egyed, and N. Medvidovic, "Reconciling software requirements and architectures: The cbsp approach," in *Fifth IEEE International Symposium on Requirements Engineering*, 2001, pp. 202-211.

M. Brandozzi and D. Perry, "Transforming goal oriented requirement specifications into architectural prescriptions," in *Proceedings of First International Workshop From Software Requirements to Architectures (STRAW01)*, 2001, pp. 54-61.

D. Liu, K. Subramaniam, a. Eberlein, and G. H. Far, "Natural language requirements analysis and class model generation using UCDA," in *Lecture Notes in Computer Science*. Springer-Verlag, 2004, pp. 295-304.

S.P. Overmyer, B. Lavoie, and O. Rambow, "Conceptual modeling through linguistic analysis using LIDA," in *Proceedings of the 23rd International Conference on Software Engineering*, 2001, pp. 401-410.

M. Ilieva and O. Ormandjieva, "Automatic transition of natural language software requirements specification into formal presentation," in *Lecture Notes in Computer Science*. Springer-Verlag. 2005, pp. 392-397.

"IEEE Recommended Practice for Architectural Description of Software-Intensive Systems." 29 pp., 2002.

P. Kruchten. Architectural Blueprints The "4+1" View Model of Software Architecture.: *IEEE Software*, vol. 12, No. 6, pp. 42-50, 1995.

K. Verma and A. Klass, "Requirements analysis tool: A tool for automatically analyzing software requirements documents," in *ISWC '08: Proc of the 7th International Conf. on The Semantic Web*, 2008, pp. 751-763.

P. Jain, K. Verma, A. Kass, and R.G. Vasquez, "Automated review of natural language requirements documents: generating useful warnings with user-extensible glossaries driving a simple state machine," in *ISEC '09: Proc. 2nd Annual Conf. on India Software Engineering Conference*. ACM, 2009, pp. 37-45.

"IEEE Recommended Practice for Software Requirements Specifications." 39 pp.,1998.

www.eclipse.org/modeling/emf; printed Jun. 23, 2011; 5 pp.

R.J.A. Buhr. Use case maps as architectural entities for complex systems, *IEEE Transactions on Software Engineering*, vol. 24, No. 12, pp. 1131-1155. 1998.

IBM Rational Software Architect V7, http://www-01.ibm.com/software/awdtools/architect/swarchitect, 1 p., printed Jun. 24, 2011.

Visual Studio, MSDN, http://msdn.microsoft.com/en-us/vstudio/default.aspx, 2 pp. printed Jun. 24, 2011.

IEEE Standard for Information Technology—Systems Design—Software Design Descriptions, IEEE Std 1016-2009, 2009, 40 pages.

*Interactive Computation: The New Paradigm*, Dina Goldin et al. Eds., Springer-Verlag, copyright 2006, 489 pages.

Anandha Mala, G.S. et al., "Automatic Construction of Object-Oriented Design Models [UML Diagrams] from Natural Language Requirements Specification," PRICAI, 2006, pp. 1155-1159.

Apache OpenNLP, The Apache Software Foundation, 2010, printed from the internet at <http://incubator.apache.org.opennlp/index.html> on Aug. 22, 2011, 2 pages.

Appfuse, 2008, printed from the internet at <http://appfuse.org/display/APF/Home> on Aug. 16, 2011, 2 pages.

Baader, F. et al., Chapter 3, Description Logics, Elsevier, 2007, 47 pages.

Basler, M. et al., "Introducing the Java Pet Store 2.0 Application," 2007, printed from the internet at <http://java.sun.com/jsp.utils/PrintPage.jsp?url=http%3A%2F%2Fjava.sun.com%2Fdevelo . . . > on Aug. 17, 2011, 10 pages.

Boer, R. C. D., Lago, P., Telea, R., and Vliet, H. V. 2009. Ontology-Driven Visualization of Architectural Design Decisions. In 8th Working IEEE/IFIP Conference on Software Architecture (WICSA). IEEE Computer Society, 43-52.

Booch, G. et al., *The Unified Modeling Language User Guide*, 2nd Ed., Addison-Wesley, copyright 2005, 478 pages.

Brooks, F. P. Jr., T*he Mythical Man-Month*, Essays on Software Engineering, Anniversary Edition, Addison-Wesley, 1995, 325 pages.

Clements, P. et al., "Documenting Software Architectures," Addison Wesley, 2001, 342 pages.

Crain, A., "The Simple Artifacts of Analysis and Design," IBM Software Group, 2004, printed from the internet at <http://www.ibm.com/developerworks/rational/library/4871.html> on Aug. 18, 2011, 7 pages.

Dashofy, E. M. et al., "A Comprehensive Approach for the Development of Modular Software Architecture Description Languages," ACM Transactions on Software Engineering and Methodology, vol. 14, No. 2, 2005, pp. 199-245.

Glass, R. L., *Facts and Fallacies of Software Engineering*, Addison Wesley, copyright 2003, 150 pages.

Hailpern, B. et al., "Model-Driven Development: The Good, the Bad, and the Ugly," IBM Systems Journal, vol. 45, No. 3, 2006, pp. 451-461.

IBM DeveloperWorks: Rational Software Architect, printed from the internet at <http://www.ibm.com/developerworks/rational/products/rsa/> on Aug. 18, 2011, 2 pages.

Information Technology—Open Distributed Processing—Reference model: Architecture, International Standard, ISO/IEC 10746-3, 1st Ed. 1996, 68 pages.

Information technology—Open Distributed Processing—Reference model: Foundations ISO/IEC 10746-2, 1st Ed., 1996, 28 pages.

Jansen, A. et al., "Software Architecture as a Set of Architectural Design Decisions," Proceedings of the Fifth Working IEEE/IFIP Conference on Software Architecture, 2005, 10 pages.

Keshav, R. et al., "Towards a Taxonomy of Architecture Integration Strategies," the 3rd International Software Architecture Workshop, 1998, 4 pages.

Kleppe, A., *MDA Explained: The Model Driven Architecture: Practice and Promise*, Addison-Wesley, copyright 2003, 187 pages.

Kruchten, P., "An Ontology of Architectural Design Decisions in Software-Intensive Systems," 2004, 8 pages.

Kruchten, P., *The Rational Unified Process: An Introduction*, 3rd ed. Object Technology Series, Addison-Wesley, copyright 2004, 320 pages.

Lami, G., "QuARS: A Tool for Analyzing Requirements," Software Engineering Measurement and Analysis Initiative, Technical Report, 2005, 46 pages.

Lau, K-K. et al., "A Taxonomy of Software Component Models," Proceedings of the 2005 31st Euromicro Conference on Software Engineering and Advanced Applications, IEEE, 2005, 8 pages.

Liu, A. et al., "Accelerating COTS Middleware Acquisition: The i-Mate Process," IEEE Software, 2003, pp. 72-79.

Maiden, N. A. et al., "Acquiring COTS Software Selection Requirements," IEEE Software, 1998, pp. 46-56.

Mattsson, A. et al., "Linking Model-Driven Development and Software Architecture: A Case Study," IEEE Transactions on Software Engineering, vol. 35, No. 1, 2009, pp. 83-93.

Mattsson, A. et al., "Modelling Architectural Design Rules in UML," Proceedings of EMMSAD, 2008, pp. 71-79.

Medvidovic, N. et al., "A Classification and Comparison Framework for Software Architecture Description Languages," IEEE Transactions on Software Engineering, vol. 26, No. 1, 2000, pp. 70-93.

Mich, L. et al., "NL-OOPS: a Requirements Analysis Tool based on Natural Language Processing," Data Mining III, 2002, pp. 321-330.

Morisio, M. et al., "Definition and Classification of COTS: A Proposal," ICCBSS, Orlando, FL, 2002, 10 pages.

(56) References Cited

OTHER PUBLICATIONS

Parmee, I. C., Ch. 11, "Towards Interactive Evolutionary Design Systems," Evolutionary and Adaptive Computing in Engineering Design, London: Springer-Verlag, 2001, pp. 205-231.

Pilone, D. et al., *UML 2.0 in a Nutshell: A Desktop Quick Reference*, O'Reilly, copyright 2005, 235 pages.

Robillard, P. N., "The Role of Knowledge in Software Development," Communications of the ACM, vol. 42, No. 1, 1999, pp. 87-92.

Sarkar, S. et al., Accelerating Technical Design of Business Applications—A Knowledge-Based Approach, India Software Engineering Conference 2010, ACM, 2010, pp. 43-50.

Sarkar, S. et al., "EAML—Architecture Modeling Language for Enterprise Applications," Proceedings of the IEEE International Conference on E-Commerce Technology for Dynamic E-Business, IEEE Computer Society, 2004, 8 pages.

Schmerl, B. et al., "AcmeStudio: Supporting Style-Centered Architecture Development," In Proc. 2004 International Conference on Software Engineering, Edinburgh, Scotland, 2004, 2 pages.

Schmidt, D., "Model-Driven Engineering," IEEE Computer Society, 2006, pp. 25-31.

Selic, B. "The Pragmatics of Model-Driven Development," IEEE Software, 2003, pp. 19-25.

Shahin, M. et al., "Improving Understandability of Architecture Design through Visualization of Architectural Design Decision," SHARK '10, ACM, 2010, 8 pages.

Sharma, V. S. et al., "Extracting High-Level Functional Design from Software Requirements," 2009 16th Asia-Pacific Software Engineering Conference, IEEE, 2009, pp. 35-42.

Simons, C. L. et al., "Interactive, Evolutionary Search in Upstream Object-oriented Class Design," IEEE Transactions on Software Engineering, 2010, pp. 1-20.

Simsion, G. C. et al., *Data Modeling Essentials*, 3rd Ed., Morgan Kaufmann, copyright 2005, 543 pages.

Skyway software, printed from the internet at <http://www.skywaysoftware.com/> on Aug. 22, 2011, 3 pages.

Steinberg, D. et al., *EMF: Eclipse Modeling Framework*, 2nd ed., Addison-Wesley, copyright 2009, 716 pages.

Svetinovic, D., et al., "Concept Identification in Object-Oriented Domain Analysis: Why Some Students Just Don't Get It," Proceedings of 13th IEEE Conference on Requirements Engineering, IEEE Computer Society, 2005, 10 pages.

The Protege Ontology Editor and Knowledge Acquisition System, printed from the internet at <http://protege.stanford.edu/> on Aug. 16, 2011, 2 pages.

Tolvanen, J-P. et al., "Defining Domain-Specific Modeling Languages to Automate Product Derivation: Collected Experiences," SPLC 2005, pp. 198-209.

Whitehurst, D., *The AppFuse Primer*, SourceBeat, LLC, copyright 2008, 216 pages.

Zannier, C. et al., "A Model of Design Decision Making Based on Empirical Results of Interviews with Software Designers," Information and Software Technology, vol. 49, 2007, pp. 637-653.

\* cited by examiner

FIG. 3

| REQ TP | HEUR | REQ TEXT STRUCT | CAND CL'S | RELAT'S | METHODS |
|---|---|---|---|---|---|
| SA | HSA1 HSA2 HSA3 | S="FirstAgent shall ActionPhrase Entity Phrase preposition SecondAgent" | First-Agent, Second-Agent | FirstAgent → SecondAgent | HSA1: If SecondAgent is a Generic entity or System, Method: SecondAgent.{ActionPhrase+EntityPhrase}() HSA2: IF SecondAgeint is Human, Method: FirstAgent.{ActionPhrase+EntityPhrase}() HSA3: If Action Phrase is "have", No Method |
| E | HE1 | S="FirstAgent shall allow SecondAgent1 ActionPhrase EntityPhrase <preposition SecondAgent2>" | First-Agent, SecondAgent1, <Second-Agent2> | FirstAgent → SecondAgent1 → <First-Agent Second-Agent2> | Method: FirstAgent.{ActionPhrase+EntityPhrase}() |
| | HE2 | S="FirstAgent shall allow SecondAgent1 ActionPhrase EntityPhrase <preposition SecondAgent2>" | First-Agent, Second-Agent | FirstAgent → SecondAgent | Method: FirstAgent.{ActionPhrase+EntityPhrase}() |
| P | HP | S= "FirstAgent is associated with <quantifier> SecondAgent | First-Agent, Second-Agent | FirstAgent → SecondAgent | No method. |
| D | HD | S="FirstAgent is classifed as a type of SecondAgent | First-Agent, Second-Agent | FirstAgent —▷ SecondAgent | No method. |

⎯→ Represents an Association relationship ⎯▷ Represents an Generalization relationship

FIG. 5

| | |
|---|---|
| 1 - The project Resource Management System shall allow a Resource Manager to assign an Employee to projects. 502 | 8 - The Assign Resource Module shall add an assignment start-date to the assignment record. 504 |
| 2 - The Project Resource Management System shall allow a Resource Manager to associate an Emmployee to a Project Lead. 502 | 9 - The Assign Resource Module shall add an assignment date to the assignment record. 504 |
| 3 - The Project Resource Management System shall allow a Resource Manager to assign roll on, roll-off dates to employee project assignment. 502 | 10 - Resource Manager is classified as a type of role. 506 |
| | 11 - Project Lead is classified as a type of a role. 506 |
| | 12 - Project Lead shall have one to many employees. 506 |
| 4 - The Proejct Resource Management System shall be able to generate activity reports on all assignment actions. 504 | 13 - Employee is classified as a type of a role. 506 |
| | 14 - A role is associated with a project. 506 |
| 5 - The Assign Resource Module shall choose active Projects from the Master Project Repository. 504 | 15 - The Master Project Repository shall allow a Maintain Project Module to add project lead from the Master Employee Repository. 508 |
| 6 - The Assign Resource Module shall choose unassigned from the Master Employee Repository. 504 | 16 - The Master Project Repository shall allow Maintain Project Module to retrieve project record. 508 |
| 7 - The Assign Resource Module shall choose open Roles from the Project Role Repository. 504 | |

| |
|---|
| 17 - A project shall have only one Project Lead at any one time. 508 |
| 18 - The Reporting Module shall allow Resource Manager to request batch report jobs. 502 |
| 19 - The Reporting Module shall allow Resource Manager to request batch report jobs. 502 |
| 20 - The Reporting Module shall give Read access to the Project Lead. 502 |
| 21 - The Maintain Project Module shall provide Project role history to the Assign Resource Module. |
| 22 - The Reporting Module shall send email project record status report to the Resource manager at the end of each pay period. 502 |
| 23 - The Assign Resource Module shall send credit verification request to the Credit Check System. 510 |

500

FUNCTIONAL DESIGN CREATION TOOL

This application claims the benefit of priority under 35 U.S.C. §119(a) to Indian Patent Application No. 2768/MUM/2009 filed on Nov. 30, 2009, which is incorporated by reference herein in its entirety.

TECHNICAL FIELD

This application relates to automatic generation of a functional design diagram, and more particularly, to automatic generation of a functional design diagram based on a requirements specification.

BACKGROUND

Design of systems, such as software systems, may begin with a diagram depicting operation of the system. Such diagrams may be based on a set of requirements that the system must perform in order to function as desired. The diagrams may be manually created through software tools requiring a system developer to generate a diagram through manual input based on each requirement statement present in a requirements specification.

SUMMARY

A functional design creation tool may automatically generate a functional design diagram based on a processed requirements specification including a plurality of processed requirement statements. The functional design creation tool may implement a functional design creation module executable on a computer device. The functional design creation module may extract particular information from each processed requirement statement. The functional design creation module may apply one or more glossaries containing various functional design terms and associated definitions to determine content of each processed requirement statement. The functional design creation module may also select one or more heuristic rules to apply to the extracted information to generate components of a functional design diagram. The functional design creation module may generate a functional design diagram based on the generated components. The functional design creation module may transmit the functional design diagram to one or more displays for visual presentation.

Further objects and advantages of the present invention will be apparent from the following description, reference being made to the accompanying drawings wherein the preferred embodiments of the present invention are clearly shown.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

FIG. 3 is an example set of heuristic rules.

FIG. 5 is an example requirements specification.

DETAILED DESCRIPTION OF THE DRAWINGS

A functional design creation tool may generate one or more functional design diagrams based on a requirements specification. The functional design creation tool may receive a previously-processed requirements specification to determine the content of the functional design diagrams. The functional design creation tool may be configured to extract particular information from the processed requirements specification. The functional design creation tool may apply a set of heuristic rules to the extracted information to generate functional design diagram components. The functional design creation tool may generate a functional design diagram based on the generated functional design diagram components. The functional design creation tool may transmit the functional design diagram to one or more displays for visual presentation.

Figure 1:
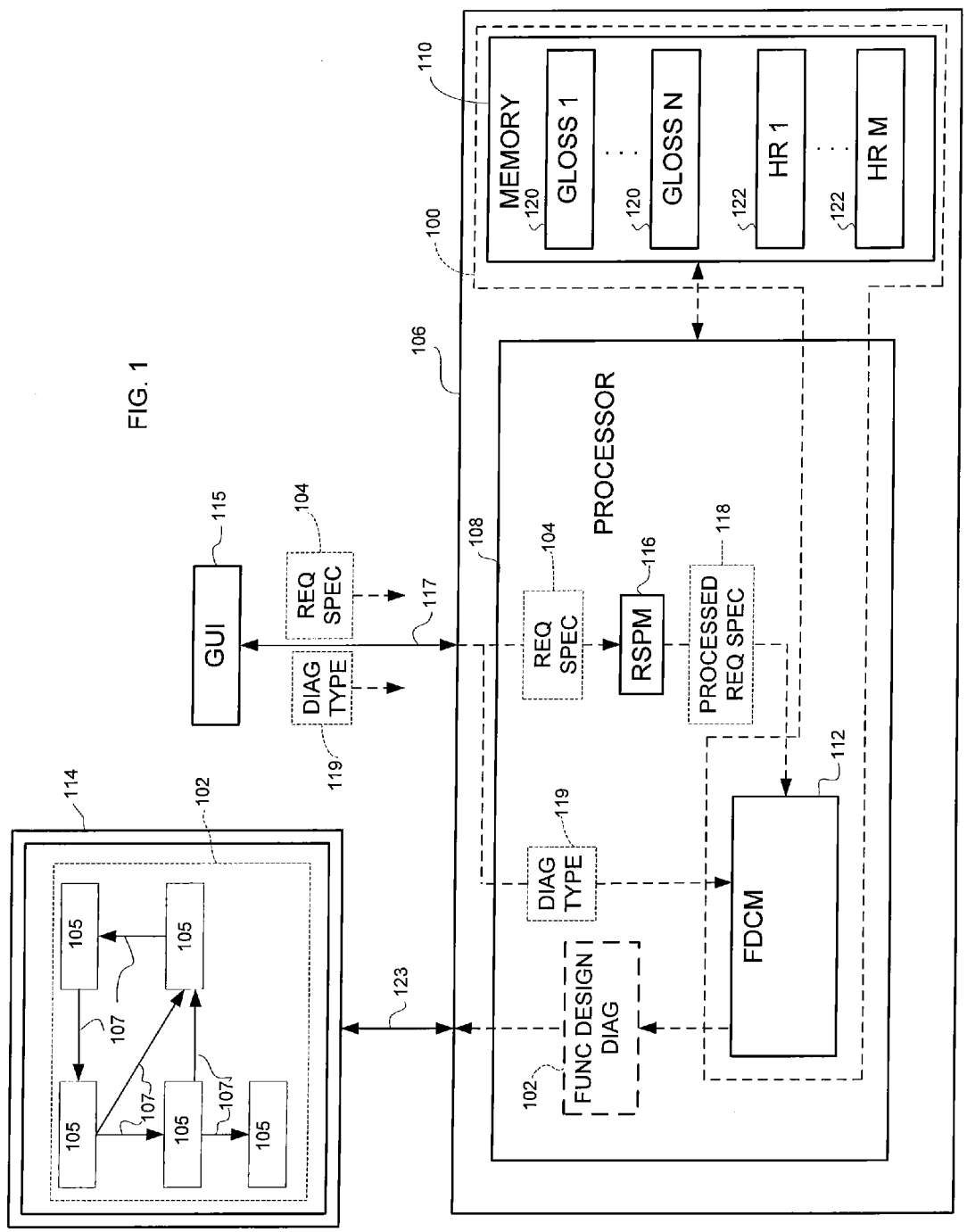
FIG. 1 is a block diagram of an example functional design creation tool.

FIG. 1 is a block diagram of a functional design creation tool (FDCT) 100. The FDCT 100 may automatically generate a functional design diagram 102 based on a processed requirements specification 104. The functional design diagram 102 may be a visual representation of a system, such as a software system, for example. The functional design diagram 102 may include a plurality of functional design diagram components such as elements 105 and relationship indicators 107. The elements 105 may represent various aspects of a system to be described by the functional design diagram 102, and the relationship indicators 107 may indicate particular relationship types between the elements 105. In one example, the functional design diagram 102 may be a class diagram used to represent structural aspects of system design problems. Class diagrams may include a set of candidate classes that represent high level functional design elements 105. The classes may represent high level, coarse-grained functional system modules, as opposed to low level implementation classes. The functional design diagram 102 may be another type of diagram such as an entity diagram, or any other diagram type capable of conveying a functional design of a system. The functional design diagram 102 may be based in Unified Modeling Language (UML), such as a UML class diagram or UML entity diagram.

A requirements specification 104 may refer to one or more documents containing a description of desired behavior or functionality of a system to be developed, such as a software system. The requirements specification 104 may include a set of functional requirements (such as use cases) that describe interactions that users may have with software described by the requirements specification 104. In addition, the requirements specification 104 may include nonfunctional requirements that may impose constraints on the design or implementation of the software developed from the requirements specification 104, such as performance engineering requirements, quality standards, or design constraints.

Figure 2:
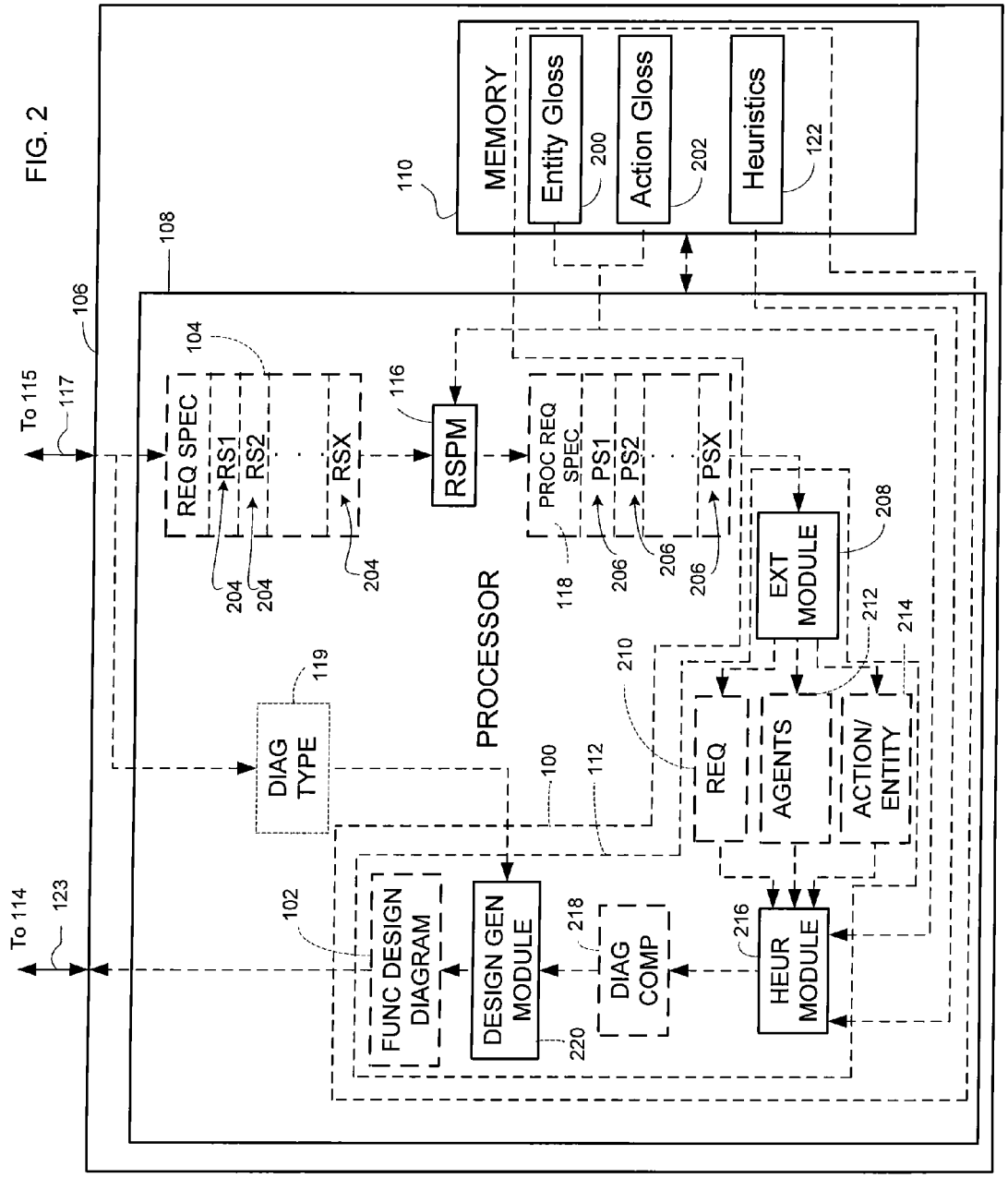
FIG. 2 is another block diagram of the example functional design creation tool of FIG. 1.

In one example, the requirements specification 104 may include a plurality of requirement statements 204 (FIG. 2). Each requirement statement 204 may provide one or more particular aspect(s) with regard to overall software architecture as described by the requirements specification 104.

Based on the content of the requirement statements 204 present in the requirements specification 104, a functional architecture of software described by the requirements specification 104 may be shown through the functional design diagram 102. The functional design diagram 102 may statically or dynamically represent a system.

In FIG. 1, the FDCT 100 may implement a computer device 106 having a processor 108 and a memory 110. The memory 110 may include one or more memories and may be computer-readable storage media or memories, such as a cache, buffer, RAM, removable media, hard drive or other computer readable storage media. Computer readable storage media may include various types of volatile and nonvolatile storage media. Various processing techniques may be implemented by the processor 108 such as multiprocessing, multitasking, parallel processing and the like, for example. The processor 108 may include one or more processors. The FDCT 100 may be implemented by various analysis and design tools such as Rational Software Architect (RSA) by IBM of Armonk, N.Y., or Microsoft Visio by Microsoft Corp. of Redmond, Wash. The FDCT 100 may generate an output, such as the functional design diagram 102, in environments such as these.

The FDCT 100 may include a functional design creation module (FDCM) 112 executable by the processor 108 to generate the functional design diagram 102 based on the requirements specification 104. The term "module" may be defined to include a plurality of executable modules. As described herein, the modules are defined to include software, hardware or some combination thereof executable by the processor 106. Software modules may include instructions stored in the memory 110, or other memory device, that are executable by the processor 108 or other processor. Hardware modules may include various devices, components, circuits, gates, circuit boards, and the like that are executable, directed, and/or controlled for performance by the processor 108.

The functional design diagram 102 may be transmitted from the computer device 106 to a display 114 in communication interconnected with the computer device 106. The functional design diagram 102 may be transmitted to the display 114 through a connection 123. The connection 123 may represent a communication path between the display 114 and the computer device 106. The connection 123 may represent any suitable connection for communication such as direct connect, wireless, the Internet, or virtual private network, for example. The functional design diagram 102 may also be transmitted to a plurality of displays, such as the display 114.

In one example, the FDCM 112 may generate the functional design diagram 102 based on the requirements specification 104 having a predetermined format. In one example, the requirements specification 104 may be provided by a user via a graphical user interface (GUI) 115. The GUI 115 may be connected to the computer device 106 through a connection 117. The connection 117 may represent a communication path between the display GUI 115 and the computer device 106. The connection 117 may represent any suitable connection for communication such as direct connect, wireless, the Internet, or virtual private network, for example. Diagram type input 119 may be received via the GUI 115 allowing a particular diagram type to be selected for generation, such as a UML class diagram or a UML entity diagram, for example.

The requirements specification 104 may be processed by a requirements specification processing module (RSPM) 116 executable by the processor 108. The RSPM 116 may process each requirement statement separately in the requirements specification 104. An output of the RSPM 116 may include a processed requirements specification 118 that includes each requirement statement individually processed for usage by the FDCM 112 as later described. In one example, the RSPM 116 may be that described in United States Patent Application Pub. No. 2009/0138793. However, various other techniques may be utilized to process the requirements specification 104, such as natural language processing techniques, predetermined requirement statements, or any other technique to properly process the requirements specification 104.

Upon receipt of the processed requirements specification 118, the FDCM 112 may access a plurality of glossaries 120 and a heuristics data set 122. The glossaries are individually designated as GLOSS 1 through GLOSS N and the heuristics data set 122 is individually designated as HR 1 through HR M in FIG. 1, where N and M may be the number of glossaries and heuristics, respectively. The plurality of glossaries 120 may include terms and associated definitions and classifications. The glossaries 120 may be domain specific (e.g. banking, utilities, etc.) The terms may be present in both the processed requirements specification 118 and the requirements specification 104 allowing the FDCM 112 to identify the terms and associated definitions and classifications for generation of the functional diagram 102.

The heuristics data set 122 may include a plurality of heuristic rules and may be accessed by the FDCM 112 in order to determine relationships and responsibilities between the identified terms in the processed requirements specification 118. In one example, the FDCM 112 may apply the heuristics data set 122 to the processed requirements specification 118 in order to generate components for the functional design diagram. For example, the FDCM 112 may recognize particular relationships between entities based on the processed requirements specification 118. The FDCM 112 may generate particular elements 105 and relationship indicators 107 based on the glossary data sets 120 and the heuristics data set 122 to form the functional design diagram 102. The functional design diagram 102 may be transmitted to one or more displays 114.

FIG. 2 shows another block diagram of the FDCT 100. The glossaries 120 may include an entity glossary 200 and an action glossary 202. The term "entity" may refer to a thing that may be recognized as being capable of an independent existence and that can be uniquely identified, such as a physical object or a concept, for example. The entity glossary 200 may include various entities that include a software solution such as systems, sub-systems, interfaces, user processes, records, and data fields. The entity glossary 200 may also include entities that represent human users of such a systems like an employee or administrator, for example, that may be present in the requirements specification 104. In one example, an entity may be an agent, which may be defined as an entity that acts for a user or other system entity in a relationship of agency.

The entity glossary 200 may also be represented by a plurality of glossaries that may be organized according to particular qualities. For example, the entity glossary 200 may include specific entries for different agents. The action glossary 202 may include valid actions for performance that may be described by the requirements specification 104. In one example, an action may refer to any direct or indirect act performed by or on an entity in a system. The action glossary 202 may be made up of a plurality of actions according to particular action qualities.

In one example, the RSPM 116 may process each requirement statement 204 in the requirements specification 114. In FIG. 2, each requirement statement 204 is designated as RS1 through RSX, where X may be the number of requirement statements. In one example, the RSPM 116 may access the glossaries 200 and 202 to identify entities and actions present in each requirement statement 204. The RSPM 116 may generate the processed requirements specification 118, which may include a processed requirement statement 206 for each requirement statement 204. Each corresponding processed requirement statement 206 is individually designated as PS1 through PSX in FIG. 2.

The RSPM 116 may also identify requirement types for each requirement statement 206. For example, the RSPM 116 may be configured to identify requirement types as illustrated in Table 1. Table 1 also provides a non-limiting definition and example for each requirement type listed.

TABLE 1

| Requirement Type | Definition | Example |
| --- | --- | --- |
| Solution Requirement (SA) | Describes a function that the solution must perform. | The Billing System shall produce Invoices with rolling rates. |
| Enablement Requirement (E) | Expresses a capability that the solution must provide to the user. | Ex. 1—The billing system shall allow the user to determine how much client owes.<br>Ex. 2—The user shall be able to generate invoices. |
| Action Constraint (AC) | Describes a constraint an entity must satisfy while performing an action. | Ex. 1—The banking system shall only delete an account when the balance is zero.<br>Ex. 2—Only managers can approve time reports. |
| Attribute Constraint (ATC) | Describes constraints on attributes and attribute values. | Customer standing must always be one of the following: 1) Gold; 2)Silver; 3)Bronze. |
| Definition (D) | Define entities. | Total sale value is defined as total item plus sales tax. |
| Policy (P) | Describes policies to be adhered to. | Sales tax is computed on in-state shipments. |

In one example, each requirement statement 204 may be deconstructed by the RSPM 116, such that entities, entity responsibilities, and requirement types may be identifiable for each requirement statement 204. For example, a requirement statement may be "The SAP System shall send vendor data to the order processing system." This statement may be identified as a solution requirement (SA) by the RSPM 116. The terms contained in the statement may be identified by the RSPM 116 as follows:

The SAP System: Agent, found in entity glossary;
shall: Modal phrase, found in action glossary;
send: Action phrase, found in action glossary;
vendor data: Entity, found in entity glossary; and
the order processing system: Agent, found in entity glossary.

Each processed requirement statement 206 may be individually processed in a similar fashion.

Each processed requirement statement 206 may be received by the FDCM 112. In one example, the FDCM 112 may include an extraction module (EM) 208. The extraction module 208 may be configured to extract various elements from each processed requirement statement 206, such as different agents, action phrases, entity phrases, and requirement types. The output of the extraction module 208 may be a requirements data set 210, agents data set 212, and an action and entity phrases data set 214. The requirements data set 210 may include identification of a particular event, task, or other condition that must occur based on the particular requirement statement 206. The agents data set 212 may include agents identified by the RSPM 116. The action and entity phrase data set 214 may include actions and entities not included in the agents data set 212 that have been identified by the RSPM 116.

A data set 210, 212, and 214 for each processed requirement statement 206 may be generated and received by a heuristics module 216 of the FDCT 100. In other examples, the data sets 210, 212, and 214 may be generated based on the entire requirements specification 104. The heuristics module 216 may apply the heuristics data set 122, as well as the entity glossary 200 and the action glossary 202 to the data sets 210, 212, and 214 to determine candidate classes and methods that the candidate classes will contain. In one example, a candidate class may refer to a type of word, such as noun, that may be considered for eligibility as a class in a UML class diagram. In one example, a method of a candidate class may refer to a service or operation provided by a physical or conceptual object, such as a class.

Based on the identified text structure in the data sets 210, 212, and 214, the heuristics module 216 may assemble element terms to be used in the functional design diagram 102, determine relationships of each element 105, and determine relationships between the elements 105. FIG. 3 is an example of heuristic rules that may be included in the heuristics data set 122. In FIG. 3, heuristic rules are shown for the requirement types of solution requirement (SA), enablement (E), policy (P), and definition (D). The heuristics data set 122 for the solution requirement according to the required text structure of the requirement statement 206 may include candidate classes of a "FirstAgent" class and a "SecondAgent" class. The relationship may be one of association. The first heuristic, HSA1, may be applied for a solution requirement if the requirement statement 206 has a text structure of "FirstAgent shall ActionPhrase EntityPhrase preposition SecondAgent." The term "ActionPhrase" may refer to an action phrase identified in the action glossary 202. The term "EntityPhrase" may refer to one or more words describing an entity as defined in the entity glossary 200. The term "SecondAgent" may refer to a "SecondAgent" as defined in the entity glossary 200. The "FirstAgent" and "SecondAgent" are identified as candidate classes based on the entity glossary 200. The first solution requirement heuristic, HSA1, may be applied if the "SecondAgent" is a generic entity or system. Thus, an element 105 of the function design diagram 102 may be generated based on the identified "FirstAgent" and the "SecondAgent."

For example, a requirement statement 206 may provide, "The Assign Resource Module shall choose active Projects from the Master Project Repository." This requirement statement 206 includes the "Requirement Text Structure" shown in FIG. 3 according to the requirement type of the solution requirement and the heuristic HSA1. Thus, the "FirstAgent"

for this example requirement statement 206 is the "Assign Resource Module." The heuristics module 216 may determine the "Assign Resource Module" based on the entity glossary 200. For this example, based on HSA1, the heuristics module 216 may also determine that the "SecondAgent" is the "Master Project Repository" based on the entity glossary 200. The relationship of the example requirement statement 206 may be determined by the heuristics module 216 to be one of association.

The heuristics module 216 may apply the heuristic rules to each requirement statement 206 individually to identify element types, element responsibilities, and element relationships. The heuristics module 216 may generate a diagram components data set 218 that is transmitted to a diagram generator module 220 included in the FDCM 112. The diagram components data set 218 may include the components used to generate the functional design diagram 102 based on application of the heuristic rules data set 122 by the heuristics module 216. The heuristics module 216 may identify each entity and the role of the entity with respect to the other entities within the system defined by the requirements specification 104. The heuristics module 216 may also determine the particular relationships between elements within the system. The diagram components data set 218 may include information of this nature.

The diagram generator module 220 may generate the functional design diagram 102 based on the diagram components data set 218. The diagram generator module 220 may generate elements 105 in the functional design diagram 102 for each entity based on the role determined by the heuristics module 216. The diagram generator module 220 may generate a particular element based on the role of the entity as determined by the heuristics module 216. The diagram generator module 220 may also generate the relationship indicators 107 based on the relationships determined by the heuristics module 216 included in the diagram components data set 218. The particular relationship indicators 107 may be generated based on the particular relationships determined by the heuristics module 216. In one example, the diagram components generator 220 may include a table or other mapping information including particular elements 105 corresponding to candidate classes identified in the heuristics data set 122, such as that shown in FIG. 3. The diagram generator module 220 may also include particular relationship indicators 107 within the table that correspond to particular relationship types determined by the heuristics module 216, such as association or generalization.

Figure 4:
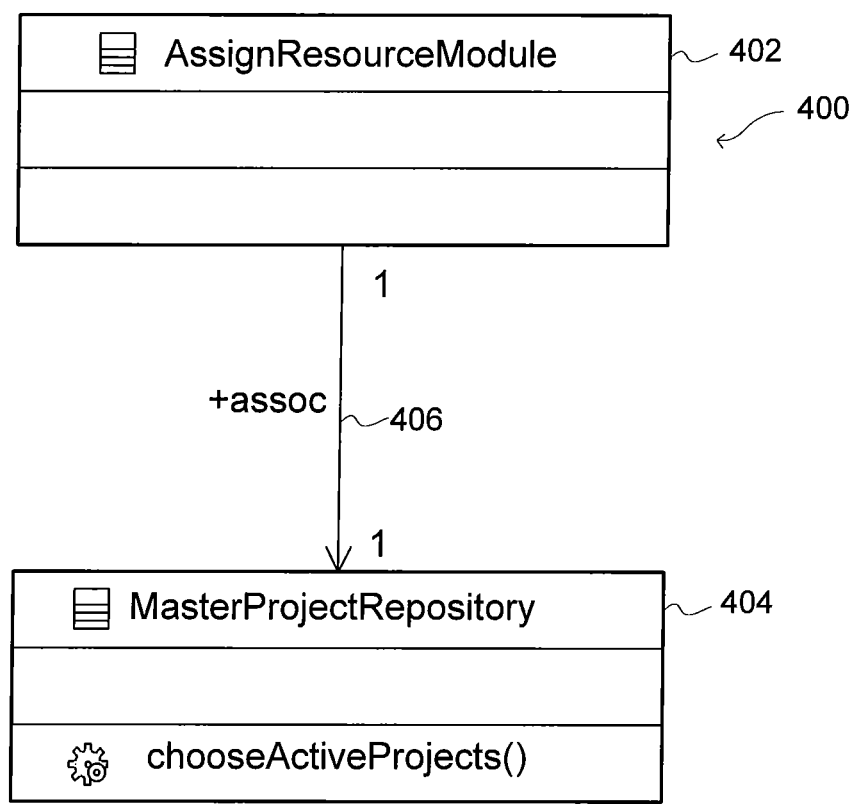
FIG. 4 is an example functional design diagram.

FIG. 4 shows an example of a functional design diagram 400 generated by the FDCT 100 based on the example statement. In one example, the design generator module 220 may be configured to generate visual components and associated names representing various concepts of a functional design diagram. In the example statement "The Assign Resource Module shall choose active Projects from the Master Project Repository," the design generator 220 may receive the diagram components data set 218 from the heuristics module 216. The "Assign Resource Module" may have been identified by the heuristics module 216 as a candidate class. The design generator module 220 may be configured to create a name and visual object associated with the "Assign Resource Module." In one example, the design generator module 220 may generate a block 402 representing the "Assign Resource Module." In other examples, various shapes may be generated for representation of various entities.

The design generator module 220 may create the name for the "Assign Resource Module" and visually provide the name in the block 402 in the diagram 400. In one example, the naming conventions used by the design generator module 220 may be based on the language include in the requirements specification 204. For example, the design generator module 220 may select the name "AssignResourceModule" to include in the block 402. Although the camel casing designation is used in FIG. 4, other naming conventions may be selected for use.

Similarly, in the example discussed, the design generator module 220 may generate a block 404 for the identified "SecondAgent" and a name for the "SecondAgent" identified as the "Master Project Repository." In one example, the design generator module 220 may generate a name of "MasterProjectRepository( )" for the "SecondAgent" using a similar naming convention as previously described. Based on the heuristic rules shown in FIG. 3, the heuristics module 216 may have identified an action phrase and an entity phrase of "choose" and "Active Projects," respectively. Based on the identification of the method by the heuristics module 216 as "MasterProjectRepsotiory.chooseActiveProjects( ), the design generator module 220 may provide the term "chooseActiveProjects( )" within the box 404 to indicate the particular dynamics of the example requirement statement. The design generator module 220 may generate a relationship indicator 406. In FIG. 4, the relationship indicator 406 is an arrow having an arrow head type and term "+assoc" designating a relationship of association between the "Assign Resource Module" and the "Master Project Repository" from the example requirement statement. The design generator module 220 may also designate cardinality, such as that indicated through "1's," in FIG. 4, indicating that one instance of the "Assign Resource Module" is associated with one instance of the "Master Project Repository."

FIG. 5 is a requirements specification 500 including a plurality of requirement statements. Based on the previous description, the requirements specification 500 may be processed by the RSPM 116 and subsequently provided as a processed version of the requirements specification 500 to the FDCM 112. In FIG. 5, twenty-three requirement statements are provided. Upon processing the requirements specification, the FDCM 112 may receive a processed requirements specification similar to the processed requirements specification 118. Upon receipt, the FDCM 112 may generate a functional design diagram. The requirements specification 500 may include various requirement statement types. For example, the requirements specification 500 may include user interface requirements 502, system processing requirements 504, definition requirements 506, rules requirements 508, and internal interface requirements 510.

Figure 6:
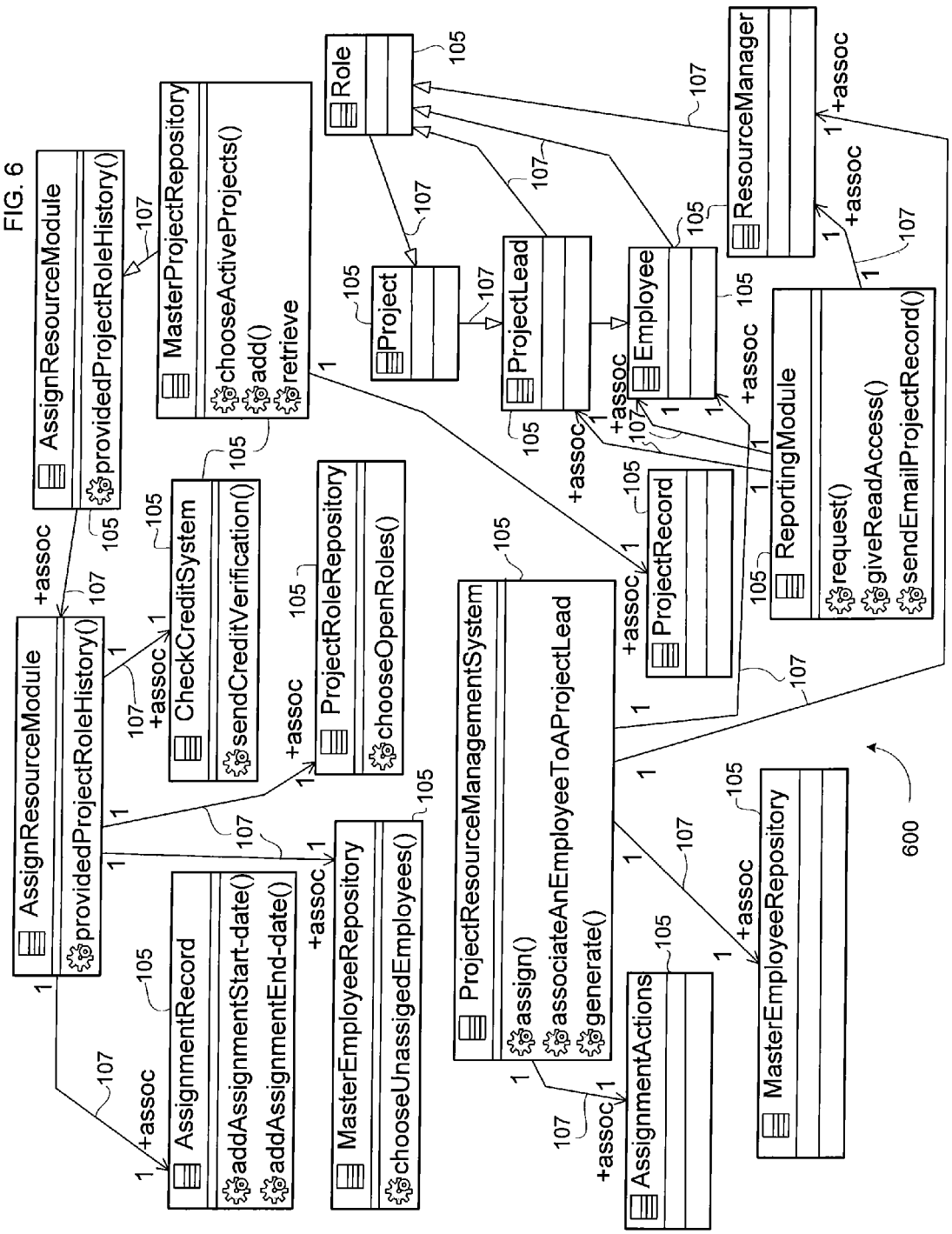
FIG. 6 is an example class diagram based on the requirements specification of FIG. 5.

FIG. 6 shows an example of a UML class diagram 600 generated based on the requirements specification 500. In one example, the diagram generator module 220 may generate a diagram such as the UML class diagram 600. The heuristics module 216 may identify the role of each entity in the diagram 600 and any associated relationship to include in a diagram components data set 218. The diagram generator module 220 may generate the elements 105 and relationship indicators 107 included in the diagram 600 based on the diagram components data set. For example, the diagram components generator 220 may generate an element 105 indicated as "Role." As provided in requirements statements 10, 11, and 13 of the requirements statement 500, an "Employee," a "Project Lead," and a "Resource Manager" may be classified as types of "Roles." Thus, as shown in FIG. 6, application of the heuristics module 216 to the requirements statement 500 subsequent to processing may allow the diagram generator module 220 to generate an element 105 for an "Employee," a "Project Lead," and a "Resource Manager" and a corresponding relationship indicator 107 for each "Role."

Figure 7:
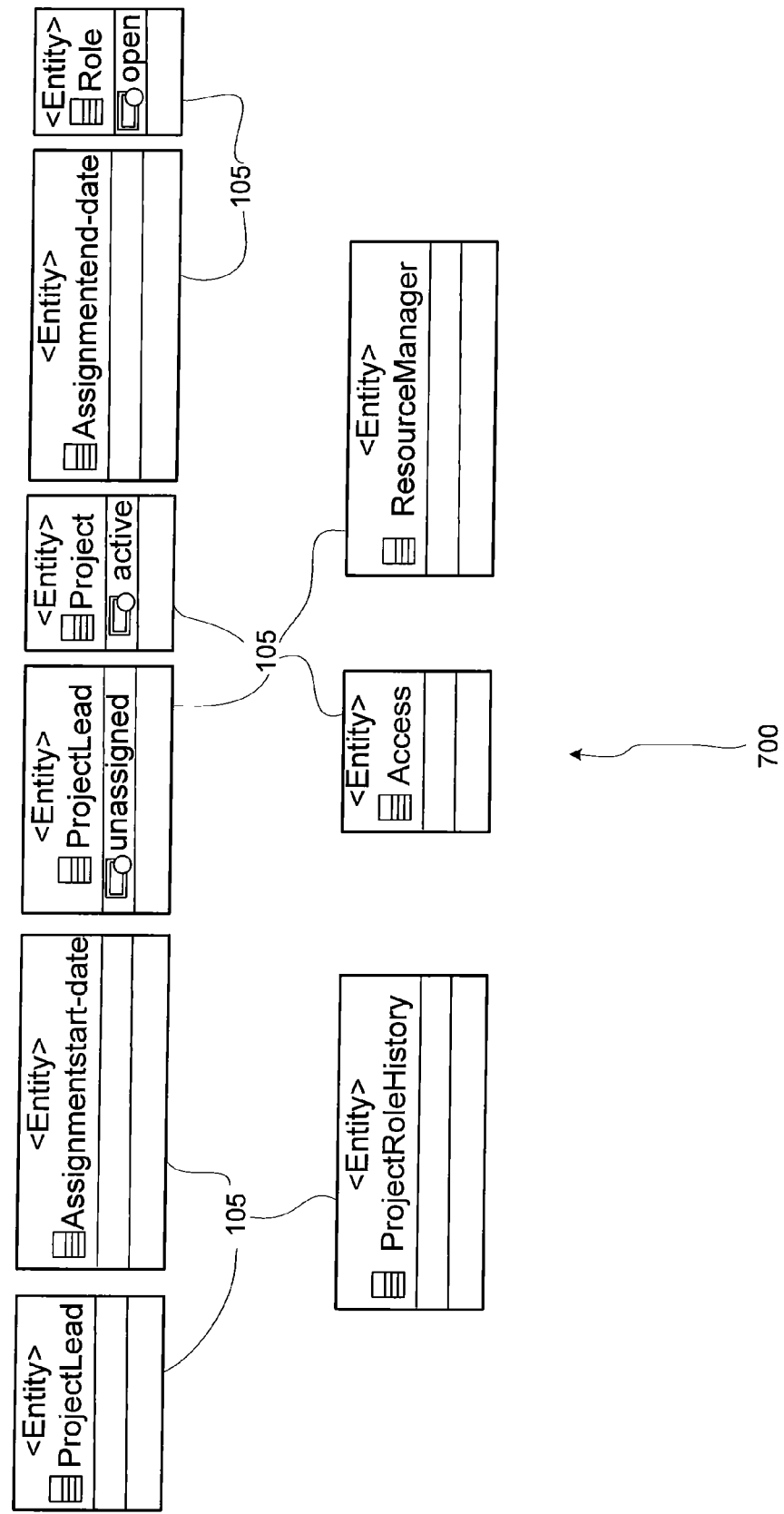
FIG. 7 is an example entity diagram based on the requirements specification of FIG. 5.

FIG. 7 shows an example UML entity diagram 700 that may be generated based on the requirements specification 600. The diagram 700 may be similarly generated by the diagram generator module 220 subsequent to application of the heuristics module 216 to the processed requirements specification.

Figure 8:
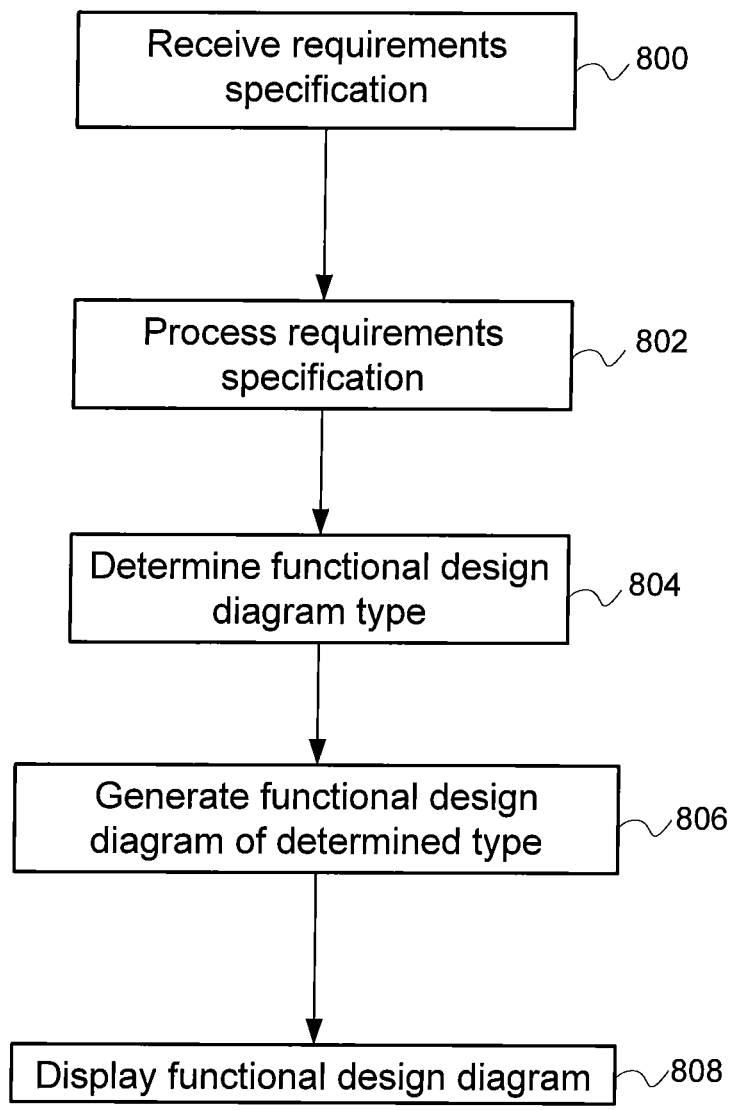
FIG. 8 is an example operational flow diagram for generating a functional design diagram.

FIG. 8 is an example operational flow diagram for generating a functional design diagram, such as the functional design diagram 102. At block 800, the requirements specification 114 may be received. In one example, the requirements specification 114 may be received through the GUI 115 by the RSPM 116. At block 802, the requirements specification 114 may be processed. The requirements specification 104 may be processed by the RSPM 116 to identify various entities and actions present in the requirements specification.

At block 804, the functional design diagram type may be determined. In one example, the functional design diagram type may be determined by the FDCT 100 based on diagram type input 119 provided by the GUI 115 via a user or an automatically preselected condition, such as a UML diagram of a particular type. For example, the FDCT 100 may receive diagram type input 119 to generate a UML class diagram. At block 806, the functional design diagram 102 may be generated by the FDCT 100. The functional design diagram 102 may be of the type determined at block 806. At block 808, the functional design diagram 102 may be displayed. In one example, the FDCT 100 may transmit the functional design diagram to one or more displays in communication with the computer device 106, such as the display 114.

Figure 9:
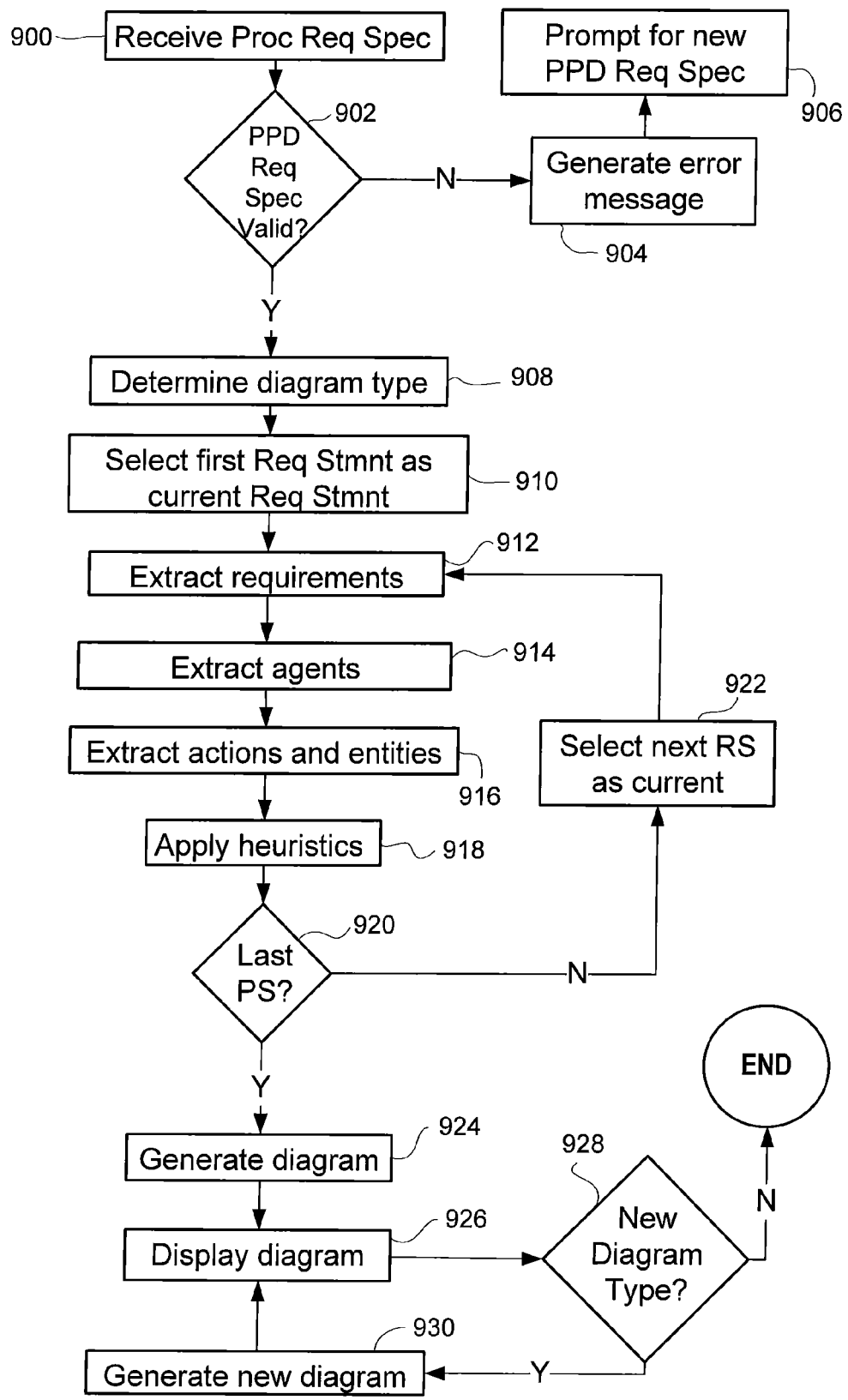
FIG. 9 is an example operational flow diagram for utilizing the functional design creation tool of FIG. 1.

FIG. 9 is an example operation flow diagram for implementing the FDCT 100. At block 900, the FDCT 100 may receive a processed requirements specification, such as the processed requirements specification 118. The requirements specification 114 may be processed in a variety of manners that allows the processing to deconstruct each requirement statement 206 for analysis. At block 902, a determination that the processed requirements specification 118 has been validly processed may be determined. In one example, the FDCT 100 may review the processed requirements specification 118 to determine that it has been properly processed. If the processed requirements specification 118 has not been properly processed, at block 904 the FDCT 100 may generate an error message. The error message may be provided to the display 114 as well as to the GUI 115. Upon generation of the error message, at block 906 a prompt for a new processed requirements specification may be generated.

If the processed requirements specification is valid, at block 908 the FDCT 100 may determine a type of functional design diagram to be generated. In one example, the determination at block 908 may be based on the diagram type input 119. In other examples, the diagram types may be automatically predetermined based on preselected conditions.

At block 910, the first processed requirement statement 206 may be set as the current requirement statement for the FDCM 116. At block 912, the requirements may be extracted from the current processed requirement statement 206 by the extraction module 208. In one example, the extraction module 208 may generate a requirements data set 210 containing the extracted requirements. At block 914, the agents may be extracted from the current processed requirement statement 206 by the extraction module 306. In one example, the extraction module 208 may generate the agents data set 212 containing the extracted agents. At block 916, the actions and entities may be extracted from the current processed requirement statement 206 by the extraction module 208. In one example, the extraction module 208 may generate an actions and entities data set 214 containing the extracted actions and entities.

At block 918, the heuristic rules may be applied to the data sets 210, 212, and 214. In one example, the heuristics module 216 may apply the heuristic rules included in the heuristics data set 122. The heuristic rules included in the heuristics data set 122 may be used to identify various components of the functional design diagram, such as the elements 105 and the relationship indicators 107. At block 920, the FDCT 100 may determine if the last processed requirement statement 206 of the processed requirements specification 118 has been processed. If more processed requirement statements 206 remain, at block 922, the next processed requirement statement 206 may be set as the current requirement statement 206 and the extractions may occur beginning at block 912.

If the last requirement statement 206 has been processed by the heuristics module 216, at block 924 the functional design diagram may be generated by the diagram generator module 220. At block 926, the functional design diagram 102 may be displayed on one or more displays, such as the display 114. At block 928 a new diagram type may be selected. For example, the FDCT 100 may generate various UML diagrams. The FDCT 100 may generate a UML class diagram initially at block 924. Upon displaying the UML class diagram, FDCT 100 may receive input from a user via the GUI 115 to display a different diagram such as a UML entity diagram. If a new diagram type is selected, at block 930 the new diagram type may be generated by the diagram generator module 220 and displayed at block 926. If a new diagram is not to be generated, the operation may end.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

We claim:

1. A method of generating a functional design diagram on a display, the method comprising:
    storing a plurality of glossary data sets on a memory device;
    storing a heuristics data set on the memory device, wherein the heuristics data set includes a plurality of heuristic rules;
    in a functional design creation module which is executed by a processor:
        receiving a processed requirements specification defining operation of a system to be developed, wherein the processed requirements specification includes a plurality of processed requirements statements that identify at least one entity included in the system, and wherein the requirements specification is processed to determine content of the requirements specification;
        retrieving the plurality of glossary data sets and the heuristics data set;
        generating a plurality of functional design diagram components for the system to be developed, based on the processed requirements statements, at least one of the plurality of glossary data sets, and at least one of the plurality of heuristic rules, wherein the plurality of functional design diagram components for the system to be developed includes the at least one entity included in the system to be developed and at least one relationship associated with the at least one entity; and wherein the functional design creation module comprises a heuristics module executable by the processor to:

apply at least one of the plurality of heuristic rules and at least one of the plurality of glossary data sets to an extracted at least one requirement, the at least one entity, and at least one action from the plurality of processed requirements statements; and generate at least one of the plurality of functional design diagram components based on the application of the at least one of the plurality of heuristic rules and the at least one of the plurality of glossary data sets;

generating a functional design diagram of the system to be developed, based on the functional design diagram components, wherein the functional design diagram is representative of the system to be developed, and wherein the functional design diagram includes at least one diagram element representative of the at least one entity of the system to be developed and a relationship indicator representative of the at least one relationship; and transmitting the functional design diagram to at least one display.

2. The method of claim 1, wherein generating the plurality of functional design diagram components comprises generating at least one functional design diagram relationship for at least one of the plurality of processed requirements statements based on the application of at least one heuristic rule to the content of each of the plurality of processed requirements statements, wherein the method further comprises generating the functional design diagram based on the at least one functional design diagram relationship.

3. The method of claim 1, further comprising:
identifying a requirement of the operation of the system to be developed based on at least one of the plurality of processed requirements statements; and
selecting the applied at least one of the plurality of heuristic rules based on the identified requirement.

4. The method of claim 3, wherein generating the plurality of functional design diagram components comprises:
generating a first functional design diagram component based on an entity present in the content of the requirements specification, where the entity performs at least one action in the system to be developed; and
generating a second functional design diagram component based on the at least one action;
wherein generating a functional design diagram comprises:
generating a diagram element based on the first functional design diagram component; and
generating a relationship indicator based on the second functional design diagram component.

5. A functional design creation tool comprising:
a plurality of glossary data sets stored on a memory device; and
a heuristics data set stored on the memory device, wherein the heuristics data set includes a plurality of heuristic rules;
a functional design creation module executable by a processor to:
receive a processed requirements specification defining functionality of a system to be developed, wherein the processed requirements specification includes a plurality of processed requirements statements that identify at least one entity included in the system to be developed;
retrieve the plurality of glossary data sets and the heuristics data set;
generate a plurality of functional design diagram components for the system to be developed, based on the processed requirements statements, at least one of the plurality of glossary data sets, and at least one of the plurality of heuristic rules, wherein the plurality of functional design diagram components for the system to be developed includes the at least one entity included in the system to be developed and at least one relationship associated with the at least one entity; and wherein the functional design creation module comprises a heuristics module executable by the processor to:
apply at least one of the plurality of heuristic rules and at least one of the plurality of glossary data sets to an extracted at least one requirement, at least one entity, and at least one action from the plurality of processed requirements statements; and
generate at least one of the plurality of functional design diagram components based on the application of the at least one of the plurality of heuristic rules and the at least one of the plurality of glossary data sets;
generate a functional design diagram of the system to be developed, based on the functional design diagram components, wherein the functional design diagram is representative of the system to be developed, and wherein the functional design diagram includes at least one diagram element representative of the at least one entity of the system to be developed and a relationship indicator representative of the at least one relationship; and
transmit the functional design diagram to at least one display.

6. The functional design creation tool of claim 5, wherein the functional design generation module comprises an extraction module executable by the processor to extract from the plurality of processed requirements statements the at least one entity, at least one requirement of the system to be developed, and at least one action to be performed by the system to be developed.

7. The functional design creation tool of claim 1, wherein the at least one of the plurality of heuristic rules is associated with one of:
a solution requirement, wherein the solution requirement is associated with a function to be performed by the system to be developed;
an enablement requirement, wherein the enablement requirement is associated with a capability to be provided by the system to be developed;
a definition, wherein the definition is associated with at least one constraint of the system to be developed; and
a policy to be adhered to by the system to be developed.

8. The functional design creation tool of claim 7, wherein the heuristics module is further executable to:
select the at least one of the plurality of heuristic rules based on the at least one requirement type; and
apply the at least one of the plurality of heuristic rules to the at least one entity and the at least one action.

9. The functional design creation tool of claim 5, wherein the functional design creation module comprises a diagram generator module executable by the processor to:
receive the plurality of functional design diagram components; and
generate the at least one functional design diagram based on the plurality of functional design diagram components.

10. The functional design creation tool of claim 9, wherein the diagram generator module is further executable to generate a diagram element included in at least one functional design diagram, wherein the diagram element corresponds to the at least one heuristic rule.

11. The functional design creation tool of claim 5, wherein the diagram generator module is further executable to:

receive an input indicative of a functional design diagram type; and generate a functional design diagram of the functional design diagram type.

12. The functional design creation tool of claim 5, wherein the functional design diagram type is one of a class diagram and an entity diagram.

13. A non-transitory computer-readable medium comprising a plurality of instructions executable by a processor, the computer-readable medium comprising:

instructions to receive a processed requirements specification describing behavior of a system to be developed, wherein the processed requirements specification includes a plurality of processed requirements statements;

instructions to retrieve a plurality of glossary data sets and a heuristics data set from a memory device, wherein the heuristics data set includes at least one heuristic rule;

instructions to generate at least one functional design diagram component based on the processed requirements specification, at least one of the plurality of glossary data sets, and the heuristics data set; wherein at least one heuristic rule and at least one of the plurality of glossary data sets are applied to an extracted at least one requirement, at least one entity, and at least one action from the plurality of processed requirements statements; and wherein the at least one functional design diagram component is generated based on the application of the at least one heuristic rule and the at least one of the plurality of glossary data sets;

instructions to generate at least one functional design diagram based on the at least one functional design diagram component, the functional design diagram being representative of the system to be developed; and instructions to transmit the functional design diagram to at least one display.

14. The non-transitory computer-readable medium of claim 13, further comprising instructions to extract at least one requirement of the functionality of the system to be developed, at least one entity associated with the requirement, and at least one action to be performed by the at least one entity based on the at least one requirement.

15. The non-transitory computer-readable medium of claim 14, further comprising:

instructions to determine at least one requirement type based on the at least one requirement; and instructions to retrieve at least one heuristic rule from the heuristics data set based on the determined at least one requirement type; and instructions to apply the at least one heuristic rule to the at least one entity and the at least one action.

16. The non-transitory computer-readable medium of claim 15, wherein the instructions to generate at least one functional design diagram component comprise instructions to generate at least one functional design diagram component based on the application of the at least one heuristic rule to the at least one entity and the at least one action, wherein the functional design diagram component is indicative of a role of the entity in the system to be developed.

17. The non-transitory computer-readable medium of claim 16, wherein the instructions to generate at least one functional design diagram comprise instructions to generate at least one functional design diagram having at least one diagram element representative of the entity.

18. The non-transitory computer-readable medium of claim 16, wherein the instructions to generate at least one functional design diagram comprise instructions to generate at least one functional design diagram having at least one relationship indicator representative of the action to be performed by the entity.

19. The non-transitory computer-readable medium of claim 13 further comprising instructions to receive a diagram type, wherein the instructions to generate at least one functional design diagram further comprise instructions to generate a functional design diagram of the received diagram type.

\* \* \* \* \*

UNITED STATES PATENT AND TRADEMARK OFFICE
CERTIFICATE OF CORRECTION

PATENT NO. : 8,677,313 B2  
APPLICATION NO. : 12/954116  
DATED : March 18, 2014  
INVENTOR(S) : Vibhu S. Sharma et al.

Page 1 of 1

It is certified that error appears in the above-identified patent and that said Letters Patent is hereby corrected as shown below:

<u>On the Title Page</u>

Page 2, left column, line 10, item (56), under "OTHER PUBLICATIONS", replace "P. Grnbacher," with --P. Grünbacher,--.

<u>In the Claims</u>

In column 12, claim 7, line 35, replace "claim 1," with --claim 5,--.

In column 12, claim 8, line 50, before "at least one requirement" delete "the".

Signed and Sealed this  
Tenth Day of February, 2015

Michelle K. Lee  
*Deputy Director of the United States Patent and Trademark Office*